Sept. 30, 1969  T. L. SMITH ET AL  3,469,852
LEAK CLAMP FOR BELL AND SPIGOT PIPE JOINT
Filed Oct. 23, 1965  4 Sheets-Sheet 2
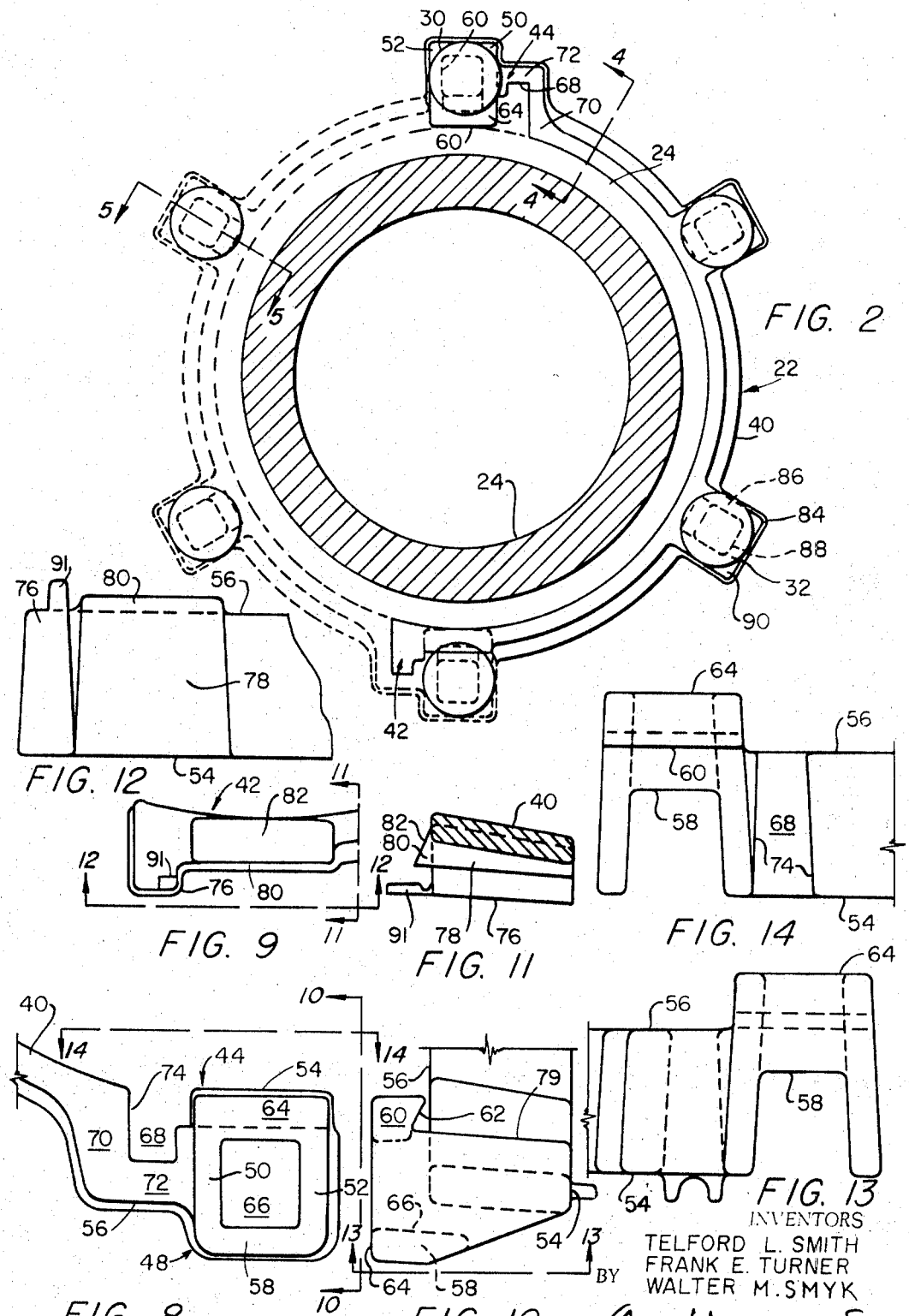
INVENTORS
TELFORD L. SMITH
FRANK E. TURNER
WALTER M. SMYK
BY Owen, Wickersham & Erickson
ATTORNEYS Sept. 30, 1969    T. L. SMITH ET AL    3,469,852
LEAK CLAMP FOR BELL AND SPIGOT PIPE JOINT
Filed Oct. 23, 1965    4 Sheets-Sheet 4

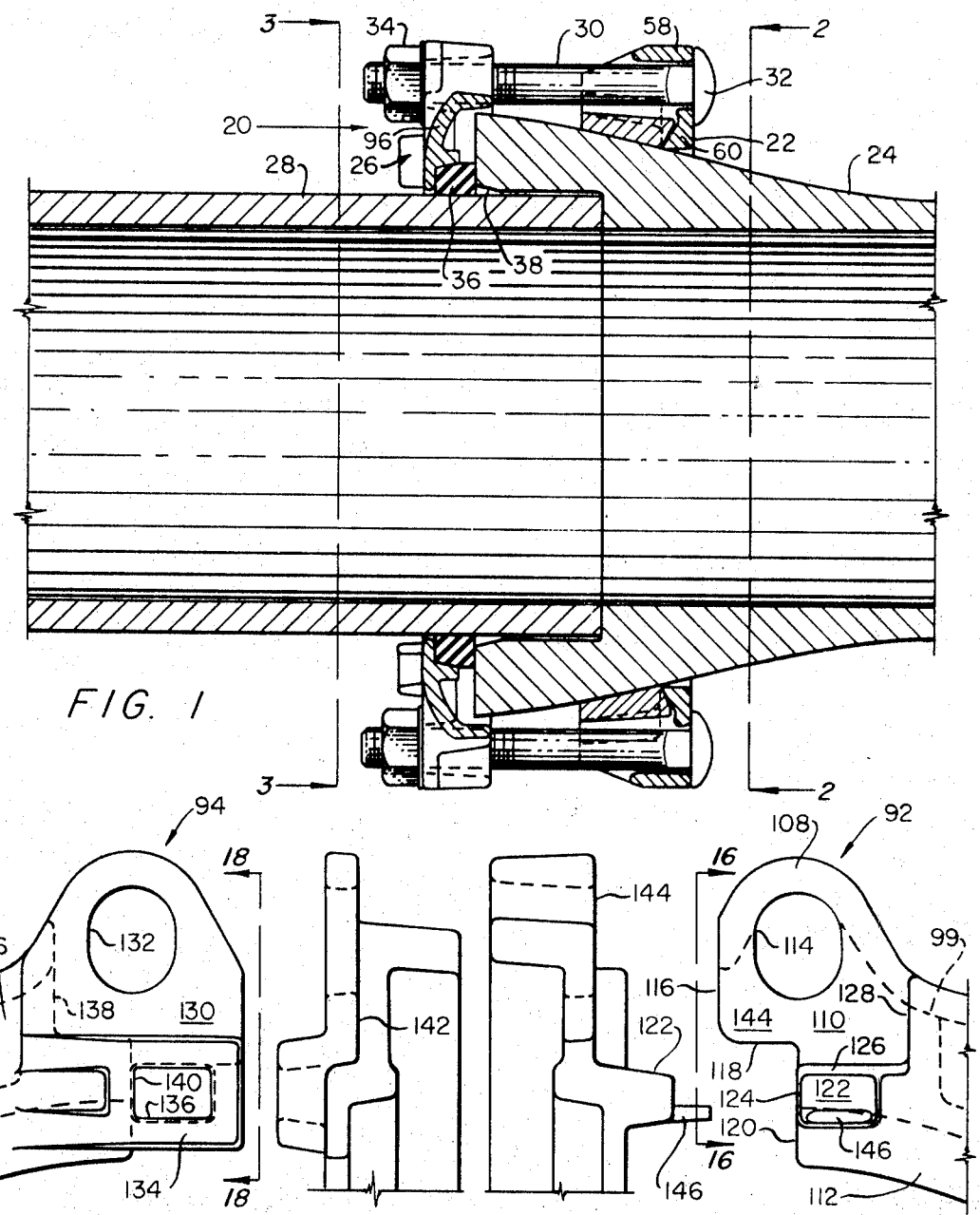

INVENTORS
TELFORD L. SMITH
FRANK E. TURNER
WALTER SMYK
BY
ATTORNEYS

United States Patent Office 3,469,852
Patented Sept. 30, 1969

3,469,852
LEAK CLAMP FOR BELL AND SPIGOT PIPE JOINT
Telford L. Smith, Millbrae, Frank E. Turner, San Mateo, and Walter M. Smyk, South San Francisco, Calif., assignors to Smith-Blair, Inc., South San Francisco, Calif., a corporation of California
Filed Oct. 23, 1965, Ser. No. 503,932
Int. Cl. F16j 15/00; F16l 19/00
U.S. Cl. 277—101                                    8 Claims

ABSTRACT OF THE DISCLOSURE

A clamp for installation at a bell and spigot pipe joint comprises a two-piece spigot ring which retains a gasket and a two-piece bell ring drawn together axially by connecting bolts. Both the spigot and bell ring members have end connectors that overlap and interlock and hold the members more firmly together as the bolts are tightened. The spigot ring connectors each have overlapping offset bolt retainer portions and a tapered stud means which fits within a mating, tapered lug opening. The bell ring connectors each have a bolt retainer portion with an adjacent slot and a beveled surface at one end and a mating, tapered lug portion at its other end adapted to fit in the slot plus a cam-like member adapted to bear against the beveled surface and force the two bell ring members together when the bolts are tightened.

---

This invention relates generally to devices for repairing leaks in pipes and more particularly it relates to an improved leak repair clamp for joints of bell and spigot type piping.

In the well-known bell and spigot type of piping, leaks often occur at the joints of pipe sections for various reasons such as the drying out of the packing or the deterioration of the leading between the pipes, or through failure of the seal at the joint due to ground settling or other causes. It has long been the practice in repairing such leaks to place a deformable gasket around the spigot pipe and to press the gasket tightly up against the face of the leaking bell by means of a clamping device around the pipe.

One principal object of the present invention is to provide an improved leak clamp for repairing the joints of bell and spigot piping that will grip the flange of the bell pipe without slipping so that a firm axial pressure can be applied to the annular gasket substantially uniformly around the entire circumference of the pipe joint thereby causing it to form an effective and durable leak-proof seal.

A further important object of the present invention is to provide an improved leak repair clamp for bell and spigot pipe joints that is comprised of a minimum of components which can be made with ease and economy by conventional manufacturing techniques. Our clamp comprises a bell ring and a spigot ring each of which is composed of two identical mating members that can be cast from malleable material in the same mold using simple well-known foundry procedures. Moreover, both the bell ring and spigot ring members are cast without the need for complicated molds or extra dry sand cores which heretofore increased the expense and time entailed in producing such parts. When installed, the uniquely shaped ring members of our clamp are drawn together by standard bolts and nuts, the spigot ring members serving to apply an annular gasket directly to the pipe joint gap where leakage occurs.

Another object of our invention is to provide a bell and spigot leak repair clamp that is unusually easy for one unskilled workman to install without the need for any special tools. Heretofore, bell joint leak clamps generally included a large number of components which had to be assembled carefully as the clamp was installed. Because installation of such clamps on buried pipe must be performed under the most adverse conditions, this need to handle, assemble and adjust a large number of parts was a serious problem, and loss of any one of the components prevented a satisfactory installation. With our improved clamp, the bell and spigot rings are each easily assembled together around the pipe ends from two large mating members and then are connected by relatively short conventional bolts. The operation is simple and can be performed by one man in a short time.

Still another object of the invention is to provide a bell joint leak clamp composed of two-piece bell and spigot rings that move into and are maintained in proper circumferential and axial alignment when the bolts are tightened. The end connector members on each ring member are provided with tapered interlocking parts which are forced together as the bolts and nuts are tightened.

Yet another object of our invention is to provide a bell joint leak clamp which can utilize a sealing gasket having a simple rectangular cross section which is confined circumferentially by the spigot ring so that it will be pressed firmly against the annular gap where the leak occurs at the pipe joint.

Other objects, advantages, and features of the present invention will become apparent from the following detailed description thereof, taken in conjunction with the accompanying drawings, in which:

FIG. 1 is a view in elevation and in section showing a leak repair clamp embodying the principles of the present invention;

FIG. 2 is a view in end elevation showing the bell ring members of the clamp of FIG. 1 with one shown in dark lines;

FIG. 8 is an enlarged fragmentary end view of the female connector for a bell ring member of our clamp;

FIG. 9 is an enlarged fragmentary end view of the male connector for a bell ring member of our clamp;

FIG. 10 is a side view of the female connector shown in FIG. 8;

FIG. 11 is a side view in section taken along the line 11—11 in FIG. 9;

FIG. 12 is a view taken along the line 12—12 of FIG. 9;

FIG. 13 is a view taken along the line 13—13 of FIG. 10;

FIG. 14 is a view taken along the line 14—14 of FIG. 8;

FIG. 15 is an enlarged fragmentary view of the male connector for the spigot ring member of one clamp;

FIG. 16 is a view taken along the line 16—16 of FIG. 15;

FIG. 17 is an enlarged fragmentary view of the female connector for the spigot ring member;

FIG. 18 is a view taken along the line 18—18 of FIG. 17;

Figure 3:
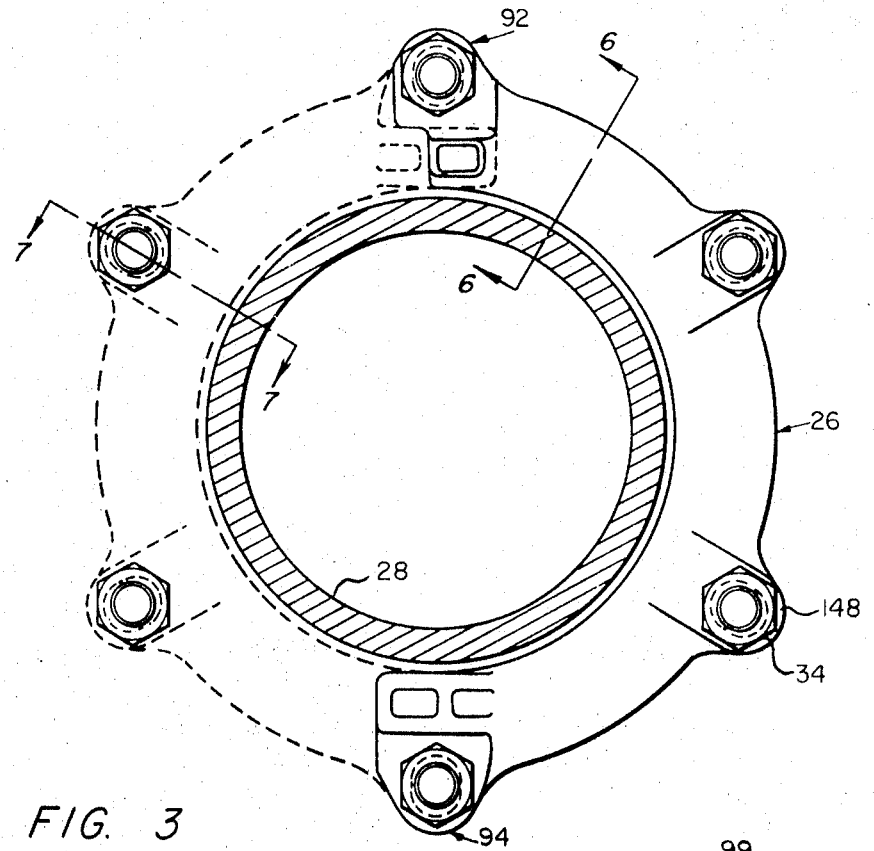
FIG. 3 is a view in end elevation showing the spigot ring members of the clamp of FIG. 1 with one shown in dark lines.

Referring to the drawings, FIG. 1 shows a clamp 20 embodying the principles of the invention and particularly adapted for sealing leaks that occur at the joints of bell and spigot pipe. In broad terms, the clamp comprises a pair of bell ring members 22 that connect together and are returned around and near the end of the flared or bell end 24 of a pipe and a pair of spigot ring members 26 that fit together in a unique manner around the spigot end 28 of an adjoining pipe. Connecting these rings 24 and 26 are a plurality of axially extending bolts 30 having head ends 32 that bear against the bell ring members 22 and threaded to nuts 34 that bear against the spigot ring members 26. An elastomeric gasket 36 or packing is retained by the connected spigot ring members 26 and is positioned to cover and bear against the annular clearance 38 between the bell and spigot pipe portions. It is here that the original packing of such bell and spigot pipe joints usually fails and starts to leak. Tightening of the nuts 34 causes the bell ring members 22 to seat firmly on the bell pipe section 24 and the spigot ring members 26 to move axially toward the end of the bell pipe, thereby pressing the gasket 36 into its sealing position.

An important feature of our clamp 20 is the fact that both the spigot ring and the bell ring are comprised of identical pairs of interlocking members, as shown in FIGS. 2 and 3. All of these members may be cast from some some suitable material such as malleable iron or bronze and thus only two molds are required to produce a clamp 20, the nuts 34 and the bolts 30, being standard items. In addition, the members 22 and 26 forming both the spigot and bell rings are shaped so that they may be molded at a high production rate using well-known casting facilities and techniques, as will be seen from the following description.

Figure 4:
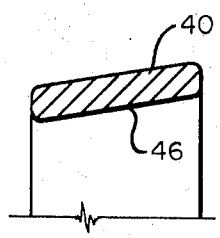
FIG. 4 is an enlarged view in section taken along the line 4—4 of FIG. 2.

The bell ring members 22, as shown in FIG. 2, each comprise a generally semicircular band portion 40 having a male connector 42 at one end and a female connector 44 at its other end. As shown in the cross sectional view of FIG. 4, the band is substantially uniform in thickness and has an inside surface 46 which slopes radially outwardly from the central axis of the clamp. This latter slope is similar in degree to the slope of the pipe bell portion 24, so when the bell members are connected atnd installed on a pipe of the appropriate size, the band inner surface 46 lies substantially flush on the sloping pipe surface. The male and female connectors 42 and 44 for the adjoining bell ring members 22 are formed so that they overlap each other when the clamp in is installed. This important feature provides unusually strong and stable connecting points for the ring members which maintain the connected ring members in the proper alignment. Each bell ring female connector 44, as shown in detail in FIGS. 8, 10, 13 and 14, comprises a bolt retaining member 48 which includes a pair of spaced apart projections 50 and 52 that are arranged transversely on and extend radially outwardly from the band 40 at one end thereof. These projections are generally parallel with each other and form an axial slot for a bolt, although they may diverge sightly as well as decreases in height toward the forward edge 54 of the band to facilitate casting. At their other ends the projections 50 and 52 have a uniform height and extend rearwardly from the rear edge 56 of the band, Across the tops of the adjacent projections is a bridging member 58, and across the bottom of these projections is an aligning wedge member 60 having an undercut surface 62 that slopes downwardly from the projections toward the axial centerline of the clamp. The ends of the projections 50, 52, the bridging member 58 and the wedge member 60 together form a bearing surface 64 having a generally rectangular opening 66 for a bolt 30 that lies axially between the projections. Adjacent to the bolt retaining member 48 at each female bell ring connector 44 is a tapered slot 68. The latter is formed by band portion 70 that abruptly turns radially outwardly from its normal curvature and then turns again at a right angle to form an intermediate portion 72 which connects at a right angle to the inside projection 50. The slot 68 thus formed has a pair of sides 74 that diverge from the rear edge 56 of the band to its forward edge 54.

The male connector 42 on each bell ring member 22, as shown in detail in FIGS. 9, 11 and 12, comprises a tapered transverse locking lug member 76 at the extreme end of the band 40 that is adapted to fit within the tapered slot 68 when the ring members are connected. This locking lug member extends above the outer surface of the band and increases in width from its rear edge 56, which is flush with the rear edge of the band, to its forward edge 54. Adjacent the lug member 76 is a raised portion 78 that extends slightly above the outer band surface and has a flat surface which is adapted to engage the lower edges 79 of the projections 50, 52 on the male connector of the mating bell ring member when two such bell ring members 22 are connected. On one end this raised portion 78 forms a projection 80 that extends beyond the rear edge of the band and has a beveled under surface 82 that extends back to the inner band surface. This latter beveled surface is substantially parallel to and flush with the beveled surface 62 of the lug portion 60 when two bell ring members 22 are connected.

Figure 5:
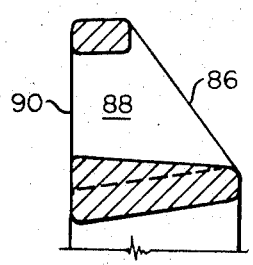
FIG. 5 is an enlarged view in section taken along the line 5—5 of FIG. 2.

Spaced apart equally between the male and female connectors 42 and 44 on the band 40 are a plurality of bolt retaining intermediate lugs 84 (see FIG. 5). Essentially these latter lugs each comprise a pair of spaced apart projections 86 which form a slot 88 within which bolts can lie which are preferably bridged over at their outer ends. The rear faces 90 of these projections 86 lie in a plane that is perpendicular to the pipe axis and each provides a surface against which a head 32 of a bolt 30 can bear when the bolt is tightened.

To help in holding a pair of bell ring members together at least temporarily around the bell end of a pipe and before the bolts are tightened, a bendable tab 91 may be provided near one side on an end surface of the locking lug 76, preferably the end surface which is normally in the same plane as the rear edge 56 of the band. These tabs may be fairly short and may be easily bent over with a hammer by a workman once the bell ring members are connected with the locking lugs in their respective slot 68.

Figures 6, 7:
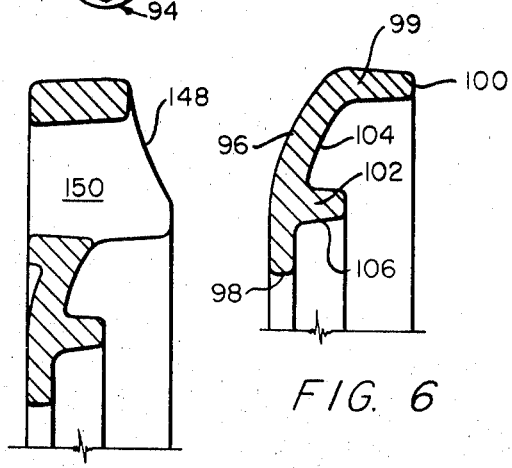
FIG. 6 is an enlarged view in section taken along the line 6—6 of FIG. 3.
FIG. 7 is an enlarged view in section taken along the line 7—7 of FIG. 3.

The spigot ring members 26 of the bell joint leak clamp 20 are somewhat similar to the bell ring members 22 in that they are identical, each being slightly longer than semicircular and having a male connector 92 and a female connector 94 at opposite ends. As shown in FIG. 6, each spigot ring member has a curved wall 96 that lies essentially perpendicular to the pipe axis at its inside edge 98, where its diameter is only slightly larger than the spigot pipe. From this inside edge the bell ring member extends radially outwardly and then curves over gradually to form a substantially axial lip portion 99 having an outer edge 100 whose diameter is greater than the outer diameter of the bell portion of the pipe on which the clamp 20 is used. Located between the inner and outer edges of each spigot ring member is an integral annular rib member 102 that protrudes axially from its inner surface 104 at a point inwardly from its inner edge 98 where the ring member 26 is still substantially perpendicular to the clamp axis. The inner surface 106 of the rib member is almost parallel to the clamp axis but preferably slopes outwardly therefrom by predetermined amount (e.g., 2°–6°). This rib member 102 serves to retain in place the annular gasket member 36 which may have a simple rectangular cross section. The slight outward slope to the rib 102 serves to compress the gasket radially by a slight amount and thus assure its proper seating and effective sealing as the clamp is tightened.

The male connector 92 for the spigot ring 28, as seen in FIGS. 15 and 16, comprises a bolt retaining boss-like member which is formed by an end portion 108 of the axially extending wall portion 99 that curves radially outwardly from its normal curvature and then curves partially back. This latter portion is integral with a transverse plate section 110 which is also integral with but recessed from the outer surface 112 of the inner, more radial portion of the curved wall 96. An oval shaped opening 114 for receiving a bolt is centrally located on said plate section whose planar surface is perpendicular to the clamp central axis. The extreme end edge 116 of the plate section and the edge of the curved integral axial end portion 108 terminates along a plane that contains the central axis of the clamp. Radially inwardly from the opening 114 the plate member has an inner edge 118 that is at a right angle to the end edge 116 and terminates at a plane passing substantially through the center of the opening and the central axis of the clamp. This latter plane also is coincident with the end surface 120 of the inner portion of the spigot ring at this end.

Extending axially from the outer surface of the spigot ring and forming a part of the male connector 92 is a slightly tapered stud member 122. One side 124 of this stud member is substantially flush with the end surface 120 and another side wall 126 terminates at the plate portion. A surface 128 substantially parallel to the surface 120 forms a shoulder at the edge of the plate portion 110 and is perpendicular to an extension of the side wall 126.

The female spigot connector 94, which meshes with the male spigot connector 92 to interconnect identical spigot ring members 26, will now be described with reference to FIGS. 17 and 18. Integral with the curved wall member 96 at its other end and aligned circumferentially with its inner radial portion is a flat plate section 130 of uniform thickness having substantially the same thickness and the same external shape as the end plate section 110. An opening 132 in the plate section 130 has the same size and shape as the opening 114. Extending rearwardly from the outer surface of the curved wall member 96 is an integral boss member 134 having an opening 136 of the appropriate size and shape to receive the stud member 122 of a mating male connector 92 of the other spigot ring member. As shown, this opening 136 is rectangular in shape and its sidewalls diverge forwardly in the same direction and at the same degree as the walls 124 and 126 of the stud member. On the inside of the female connector 94, the flat inside surface of the plate section 130 terminates at a surface 138 at a right angle thereto which is the end of the outer axial wall portion 99 of the ring member. This latter surface fits flush against the end surface 116 of the male connector 92 when the spigot ring members are connected. The opening 136 in the boss 134 has one side wall 140 which substantially lies in a plane that passes through the center of the opening 132 and through the central axis of the clamp. This latter side wall 140 also is the end surface of the inner portion of the curved wall member 96.

The flat plate section 130 is offset axially from the plate portion 110 by an amount which is equal to its thickness. Therefore, when two spigot ring members 26 of the same size are connected, the flat surfaces 142 and 144 of the plate section 130 and the plate portion 110 are flush; the stud member 122 fits within the tapered walls of the boss opening 136; and the end walls 116 and 138 are adjacent each other, as are the end walls 120 and 140.

Extending from the end of each stud member 122 we may provide a bendable tab member 146 so that when the two mating spigot ring members are connected, the tab members 146 on each stud 122 can be bent over easily against the surrounding boss portion 134, in the same manner as the previously mentioned tab members 91 are bent over to hold the spigot ring members together before the bolts are tightened.

Between the end connectors 92 and 94 are provided integral bolt retaining ears 148, each having an opening 150 similar in size to the openings 114 and 132 (see FIG. 7). These ears 148 are all aligned axially with the intermediate lug member 84 on the bell ring members 22 so that bolts 30 can interconnect the two ring components.

Figure 20:
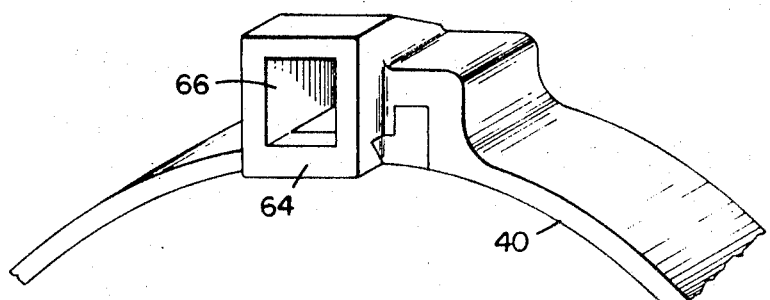
FIG. 20 is a fragmentary view in perspective showing a pair of bell ring members when normally connected.
Figure 19:
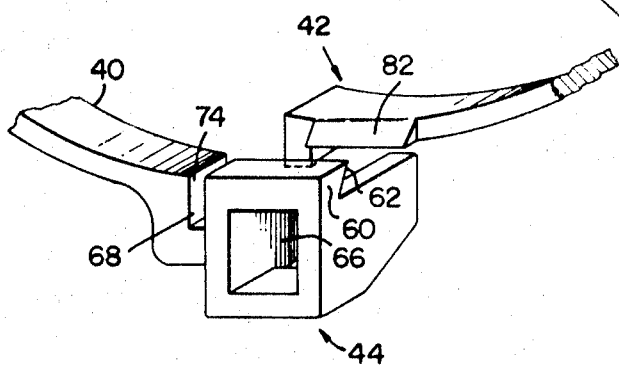
FIG. 19 is a fragmentary view in perspective showing a pair of bell ring members just before being connected.
Figure 22:
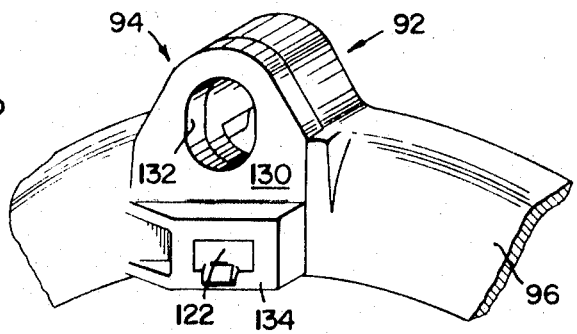
FIG. 22 is a fragmentary view in perspective showing a pair of spigot ring members when normally connected.
Figure 21:
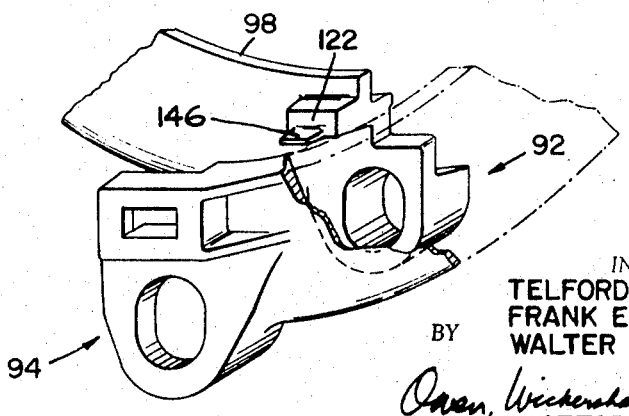
FIG. 21 is a fragmentary view in perspective showing a pair of spigot ring members just before being connected.

In operation, the annular gasket 36, which may be extruded and have a simple rectangular cross section, is placed within the seat formed by the internal rib members 102 of a pair of spigot ring members 26 which have already been placed together around the spigot pipe after having been connected together in the aforesaid manner. The manner in which the male and female spigot ring connectors are joined together is shown in perspective in FIGS. 19 and 20. The bell ring members 22 are now similarly connected around the bell end of the adjoining pipe, with the tabs 91 on the locking lugs preferably bent to help hold the bell ring members together. (See FIGS. 21 and 22.) These connected spigot and bell ring members can now be moved along the bell portion of the pipe manually until the inner surface of the band 40 is substantially flush with the pipe. With the ears 148 of the spigot ring aligned with the lugs 84 of the bell ring, the bolts can be inserted and the nuts threaded thereto.

As the nuts are tightened, any axial or circumferential misalignment of the bell ring members 22 is corrected by the camming action provided by the engaging sloped surfaces 62 and 82. Similarly, a wedging or camming action occurs as the end lug portions 76 slide within their mating slots 68. As the bolts are fully tightened the bell ring members 22 are brought firmly together and their band portions 40 tend to fit flush against the pipe outer surface to provide a firm anchor. It has been found that this occurs consistently with various configurations of bell pipe and despite the usual size variations. Further tightening of the bolts then acts to draw the spigot ring members 26 axially toward the end of the bell pipe. The gasket 26 being confined by the internal rib member 102 is forced against the annular gap between the pipe members to thereby seal it against any leakage.

From the foregoing it should be apparent that the present invention provides a leak repair clamp for bell and spigot pipe joints that is highly effective in its sealing capabilities, extremely easy to install with simple tools and a minimum of labor and yet relatively inexpensive to manufacture in large quantities. With respect to the latter feature, a review of the description and drawings will show how both the bell and spigot ring members are shaped with all critical surfaces having a draft thereby making it possible to cast them with standard wet sand molding techniques without the need for dry sand cores. Yet, this simplicity in manufacturing results in a clamp having inherent precision and proven capabilities in sealing power and reliability.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A ring for a pipe clamp adapted to anchor around the tapered portion of a pipe when pulled axially thereon and consisting of only two interconnectable arcuate members, each said member comprising:

a generally semicircular band sector having a frustoconical inner surface relative to the central axis of the ring member;

a male connector at one end and a female connector at the other end of said band sector, said male connector including a tapered transverse lug portion at the end of said band sector directly adjacent to a band portion having a generally planar surface and a projection along said band portion at the edge of said planar surface having a sloping surface in a plane that intersects said central axis;

said female connector including a pair of generally axially extending projections connected together and forming a bolt retaining opening at the end of said band sector, a tapered axial slot adjacent one of said projections and having substantially the same dimensions as said male lug portion, and a wedge member connecting the lower edges of said projections and having a sloping surface also in a plane that intersects said central axis;

said sloping surfaces on said male and female connectors being substantially diametrically opposed on said ring members so that they engage and cam the ring members into circumferential alignment when the ring is installed on a pipe.

2. A two-member ring for a pipe clamp adapted to seat an annular gasket and force it axially against an abutting member surrounding an annular gap, each ring member comprising:

a generally semi-circular sector with a cross section having a generally radial inner portion curving to a generally axial outer portion;

a male connector at one end including a bolt retaining lug having a surface perpendicular to the central ring axis and a central opening, an axial stud member located inwardly from said opening having one side coincident with an end of the inner radial sector along a diametral plane through the center of said opening;

and a female connector at the other end of the sector including a lug member with a central opening and means inwardly of its said opening forming a stud hole having one side along a diametral plane through said latter opening and coincident with the inner radial end of the sector;

whereby the openings of said lug members are aligned when the latter overlap and said stud members are with the holes of the joined together ring members.

3. In a pipe line comprising end connecting bell and spigot pipe sections, a gasket extending around the spigot end of one of such sections and engaging the bell end of an adjacent section, a clamp for applying sealing pressure to said gasket comprising:

a spigot ring formed from two substantially semicircular members having overlapping and interlocking male and female end connectors; both said connectors on said spigot ring members having bolt holding portions with openings, each said female connector having lug means forming an axial opening and each said male connector having a tapered axial stud means, said bolt holding portions of adjoining spigot members being overlapped with their openings aligned for receiving a bolt when its said stud means is within said axial opening of the adjoining connector;

a bell ring formed from two substantially semicircular members, each latter member including a band sector having a frusto-conical inner surface and with overlapping and interlocking integral male and female end connector portions;

and a plurality of bolts extending generally axially between and retained by the end portions of said spigot ring and said bell ring, and a nut attached to each said bolt for retaining it in an aligned lug member on said spigot ring;

whereby the tightening of said nuts will cause said spigot ring members to lock firmly together and press the gasket tightly into sealing position.

4. The clamp as described in claim 3 including a bendable tab member on the end of each said stud means for holding said spigot members together before the clamp bolts are tightened.

5. The clamp as described in claim 3 wherein said bolt holding portions at opposite ends of said spigot ring members are axially offset and have flat bearing surfaces, the bearing surfaces of adjoining connectors coming flush together when said stud means is seated within the opening of the female lug means.

6. The clamp as described in claim 3 wherein said male connector of each said bell ring member includes an integral axially extending and tapered lug member at the end of the band sector and a portion adjacent thereto having an outer planar surface, said female connector of each said bell ring member including a pair of spaced apart, axially extending and partially bridged over projections forming a bolt retaining slot, and means forming a tapered slot adjacent one of said projections, said tapered lug member of said male connector being seated within said tapered slot of said female connector while said projections are disposed on said planar surface when said bell ring members are connected.

7. The clamp as described in claim 6 including a lower wedge member extending between said projections and having a beveled surface, and edge means having a similarly beveled surface on said band sector along the outer edge of said planar surface, said beveled edges on mating male and female bell ring connector members being in contact with each other and serving to cam the two bell members into circumferential alignment as the bolts are tightened.

8. The clamp as described in claim 6 including a yieldable tab member extending axially from one end of said tapered lug member and serving, when bent over, to hold said bell members together as the bolts are tightened.

References Cited

UNITED STATES PATENTS

| | | | |
|---|---|---|---|
| 1,984,806 | 12/1934 | Pfefferle | 277—101 X |
| 2,009,744 | 7/1935 | Pfefferle | 285—337 X |
| 2,108,151 | 2/1938 | Teetor | 277—101 |
| 2,415,753 | 2/1947 | Newell | 277—101 |
| 2,679,410 | 5/1954 | Boughton | 285—337 X |
| 2,868,576 | 1/1959 | Boughton | 277—101 |
| 2,957,717 | 10/1960 | Bram | 277—101 X |
| 2,992,022 | 7/1961 | Risley et al. | 277—101 |
| 3,175,851 | 3/1965 | McMurray | 285—337 |

LAVERNE D. GEIGER, Primary Examiner
JEFFREY S. MEDNICK, Assistant Examiner

U.S. Cl. X.R.
285—337, 413